(12) United States Patent
Kramer et al.

(10) Patent No.: US 12,480,447 B2
(45) Date of Patent: Nov. 25, 2025

(54) REAL-TIME OPTICAL COKING SENSOR

(71) Applicant: RTX Corporation, Farmington, CT (US)

(72) Inventors: Stephen K. Kramer, Cromwell, CT (US); Amanda B. Graves, Stuart, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/624,851

(22) Filed: Apr. 2, 2024

(65) Prior Publication Data

US 2025/0305456 A1 Oct. 2, 2025

(51) Int. Cl.
| | |
|---|---|
| *F02C 7/224* | (2006.01) |
| *G01J 1/42* | (2006.01) |
| *G01N 17/00* | (2006.01) |
| *F02C 7/14* | (2006.01) |
| *G01N 21/33* | (2006.01) |

(52) U.S. Cl.
CPC ............ *F02C 7/224* (2013.01); *G01J 1/429* (2013.01); *G01N 17/004* (2013.01); *F02C 7/14* (2013.01); *F05D 2270/804* (2013.01); *F23R 2900/00004* (2013.01); *G01N 21/33* (2013.01); *G01N 2201/062* (2013.01)

(58) Field of Classification Search
None
See application file for complete search history.

(56) References Cited

U.S. PATENT DOCUMENTS

| | | | | |
|---|---|---|---|---|
| 5,382,266 | A * | 1/1995 | Lin .................. | C10L 1/2641 44/435 |
| 10,196,988 | B2 | 2/2019 | Farnum et al. | |
| 2009/0313999 | A1 | 12/2009 | Hunter et al. | |
| 2012/0285402 | A1* | 11/2012 | Foster .................. | F02C 9/18 62/7 |
| 2018/0171879 | A1 | 6/2018 | Prociw et al. | |
| 2020/0200673 | A1* | 6/2020 | Coates ............... | G01N 21/85 |
| 2023/0193832 | A1 | 6/2023 | Swann et al. | |
| 2023/0313743 | A1* | 10/2023 | Swann ................ | F02C 9/28 60/39.281 |
| 2024/0026831 | A1 | 1/2024 | Westervelt et al. | |

OTHER PUBLICATIONS

Search Report issued in European Patent Application No. 25168095. 5; Date of Mailing Sep. 12, 2025 (10 pages).

* cited by examiner

*Primary Examiner* — Gerald L Sung
*Assistant Examiner* — Alyson Joan Harrington
(74) *Attorney, Agent, or Firm* — CANTOR COLBURN LLP (57) ABSTRACT

A gas turbine engine fuel system includes a fuel delivery system, an oil cooling subsystem, a fuel delivery conditioning system, and one or more optical coking sensors. The fuel delivery subsystem delivers fuel to a gas turbine engine and the oil cooling subsystem receives heated oil from the gas turbine engine. The fuel delivery conditioning system includes a fuel/oil cooler that is in fluid communication with the fuel delivery subsystem to receive the fuel and is in fluid communication with the oil cooling subsystem to receive the heated oil. The fuel/oil cooler transfers heat from the oil to the fuel to increase a temperature of the fuel, and the optical coking sensors output a signal indicating a thermal stress of the fuel that occurs with a changing temperature of the fuel. A controller receives the voltage signal determines an onset of coking in the fuel based on the signal.

9 Claims, 4 Drawing Sheets

REAL-TIME OPTICAL COKING SENSOR

BACKGROUND

This disclosure relates to gas turbine engines, and more particularly to gas turbine engine fuel system.

Gas turbine engines typically include a compressor section, a combustor section and a turbine section. During operation air is pressurized in the compressor section, mixed with fuel, and burned in the combustor section to generate hot combustion gases. The hot combustion gases are communicated through the turbine section, which extracts energy from the hot combustion gases to power the compressor section and other gas turbine engine loads.

It is common for the gas turbine engine system to not only use the fuel to provide the energy needed to power the turbines, but also to function as a heat sink to remove heat from system components. In systems where fuel is used as a fuel/oil heat exchanger or as a motive fluid to drive fueldraulic actuators, the heat generated by those systems can be transferred (e.g., added) to fuel and removed from the components to prevent over-heating. Heat can also be transferred to the fuel as it passes through the fuel nozzles into the combustor.

BRIEF DESCRIPTION

According to a non-limiting embodiment, a gas turbine engine fuel system includes a fuel delivery system, an oil cooling subsystem, a fuel delivery conditioning system, and one or more optical coking sensors. The fuel delivery subsystem delivers fuel to a gas turbine engine and the oil cooling subsystem receives heated oil from the gas turbine engine. The fuel delivery conditioning system includes a fuel/oil cooler that is in fluid communication with the fuel delivery subsystem to receive the fuel and is in fluid communication with the oil cooling subsystem to receive the heated oil. The fuel/oil cooler transfers heat from the oil to the fuel to increase a temperature of the fuel, and the optical coking sensors output a signal indicating a thermal stress of the fuel that occurs with a changing temperature of the fuel. A controller receives the voltage signal determines an onset of coking in the fuel based on the signal.

In addition to one or more of the features described above, or as an alternative to any of the foregoing embodiments, the at least one optical coking sensor comprises a light source configured to deliver light toward the fuel; and a light sensing element configured to detect the light traveling through the fuel.

In addition to one or more of the features described above, or as an alternative to any of the foregoing embodiments, the signal indicates an amount of light absorbed by the light sensing element in in a given spectral band range.

In addition to one or more of the features described above, or as an alternative to any of the foregoing embodiments, the light source includes a light emitting diode (LED), which emits light in the UV wavelength In addition to one or more of the features described above, or as an alternative to any of the foregoing embodiments, the light sensing element includes one or a combination of, a photodiode, a phototransistor, a charge-coupled device (CCD), and a complementary metal-oxide-semiconductor (CMOS) sensor.

In addition to one or more of the features described above, or as an alternative to any of the foregoing embodiments, the LED is an ultraviolet (UV) LED configured to emit light in a UV wavelength.

In addition to one or more of the features described above, or as an alternative to any of the foregoing embodiments, he at least one optical coking sensor comprise a first optical sensor disposed upstream from the fuel delivery subsystem; and a second optical sensor disposed downstream from the fuel delivery subsystem.

In addition to one or more of the features described above, or as an alternative to any of the foregoing embodiments, the first optical sensor outputs a first signal indicating a first thermal stress of the fuel delivered by fuel delivery subsystem.

In addition to one or more of the features described above, or as an alternative to any of the foregoing embodiments, the second optical sensor outputs a second signal indicating a second thermal stress of the fuel delivered into a manifold of the gas turbine engine.

In addition to one or more of the features described above, or as an alternative to any of the foregoing embodiments, the controller determines a first thermally stressed color of the fuel delivered by fuel delivery subsystem and a second thermally stressed color of the fuel delivered into a manifold of the gas turbine engine; determines a color deviation between the second first thermally stressed color and the first thermally stressed color; and determines the onset of coking in response to the color deviation exceeding a darkening threshold.

According to another non-limiting embodiment, an optical coking sensor comprises a light source and a light sensing element. The light source is configured to deliver light toward fuel. The light sensing element is configured to detect light traveling through the fuel, and to output a signal indicating a thermal stress of the fuel that occurs with a changing temperature of the fuel.

In addition to one or more of the features described above, or as an alternative to any of the foregoing embodiments, the signal indicates an amount of light absorbed by the optical sensor in a given spectral band range.

In addition to one or more of the features described above, or as an alternative to any of the foregoing embodiments, the light source includes a light emitting diode (LED).

In addition to one or more of the features described above, or as an alternative to any of the foregoing embodiments, the light sensing element includes one or a combination of, a photodiode, a phototransistor, a charge-coupled device (CCD), and a complementary metal-oxide-semiconductor (CMOS) sensor.

In addition to one or more of the features described above, or as an alternative to any of the foregoing embodiments, the LED is an ultraviolet (UV) LED configured to emit light in a UV wavelength.

According to another non-limiting embodiment, a method of determining an onset of coking in fuel flowing through a gas engine turbine fuel system is provided. The method comprises delivering fuel from a fuel delivery subsystem to drive a gas turbine engine, delivering the fuel to a fuel delivery conditioning system including a fuel/oil cooler, and selectively delivering heated oil from the gas turbine engine to an oil cooling subsystem and to the fuel/oil cooler, the fuel/oil cooler configured to transfer heat from the heated oil to the fuel to increase a temperature of the fuel. The method further comprises outputting, via at least one optical coking sensor, a signal indicating a thermal stress of the fuel that occurs with a changing temperature of the fuel, and determining, via a controller, an onset of coking in the fuel based on the thermal stress of the fuel indicated by the signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed turbine vane and method of cooling are presented herein by way of exemplification and not limitation with reference to the figures.

When utilizing the gas turbine engine fuel as a heat sink, the amount of heat that can be added to the fuel is limited by the temperature at which the fuel starts to varnish and form coke. Currently, petroleum derived jet fuels start to thermally and oxidatively degrade at temperatures in the range of 400 degrees Fahrenheit (F°). To maintain safe operation, fuel temperatures are limited to less than that to avoid the formation of coke and varnish in the fuel nozzle. This limits the amount of heat that can be placed in the fuel by the heat exchangers and actuators. Commonly, the temperature limit set for fuel exiting the heat exchangers is much lower than the initial coking temperature in order to provide margin for the safe operation of the engine.

It is desired to put more heat in the fuel. There is much waste heat in an engine and aircraft: heat from the gears and bearings lubricated by oil; heat from electronics, and so on. If this heat can be placed into the fuel, it helps with engine efficiency: hotter fuel has more energy than cooler fuel. For every 100 F° increase in fuel temperature, there is a 0.3% savings in fuel burn. Sustainable Aviation Fuels (SAFs) have been shown to have higher coking temperatures than petroleum-derived jet fuels. However, these fuels are only now coming into use, and the limits of a mixture of SAF and petroleum based jet fuel are different from a pure SAF. Therefore, as more and more SAF enters into use, it is desired to utilize the higher temperature capacity of the SAF as additional heat sink and fuel burn reduction.

Various non-limiting embodiments of the present disclosure provides an optical coking sensor that facilitates a real-time thermal stress (e.g., fuel darkening) measurement of the fuel flowing through the gas turbine engine. The thermal stress (e.g., fuel darkening) can be utilized to determine a real-time thermal stress threshold (e.g., a darkening threshold) at which the fuel can be heated before the fuel begins experience coking. In this manner, the maximum amount of heat to be placed in the fuel can be determined in real-time, thereby allowing the gas turbine engine system to actively control the fuel temperature to prevent the occurrence of coking.

Figure 1:
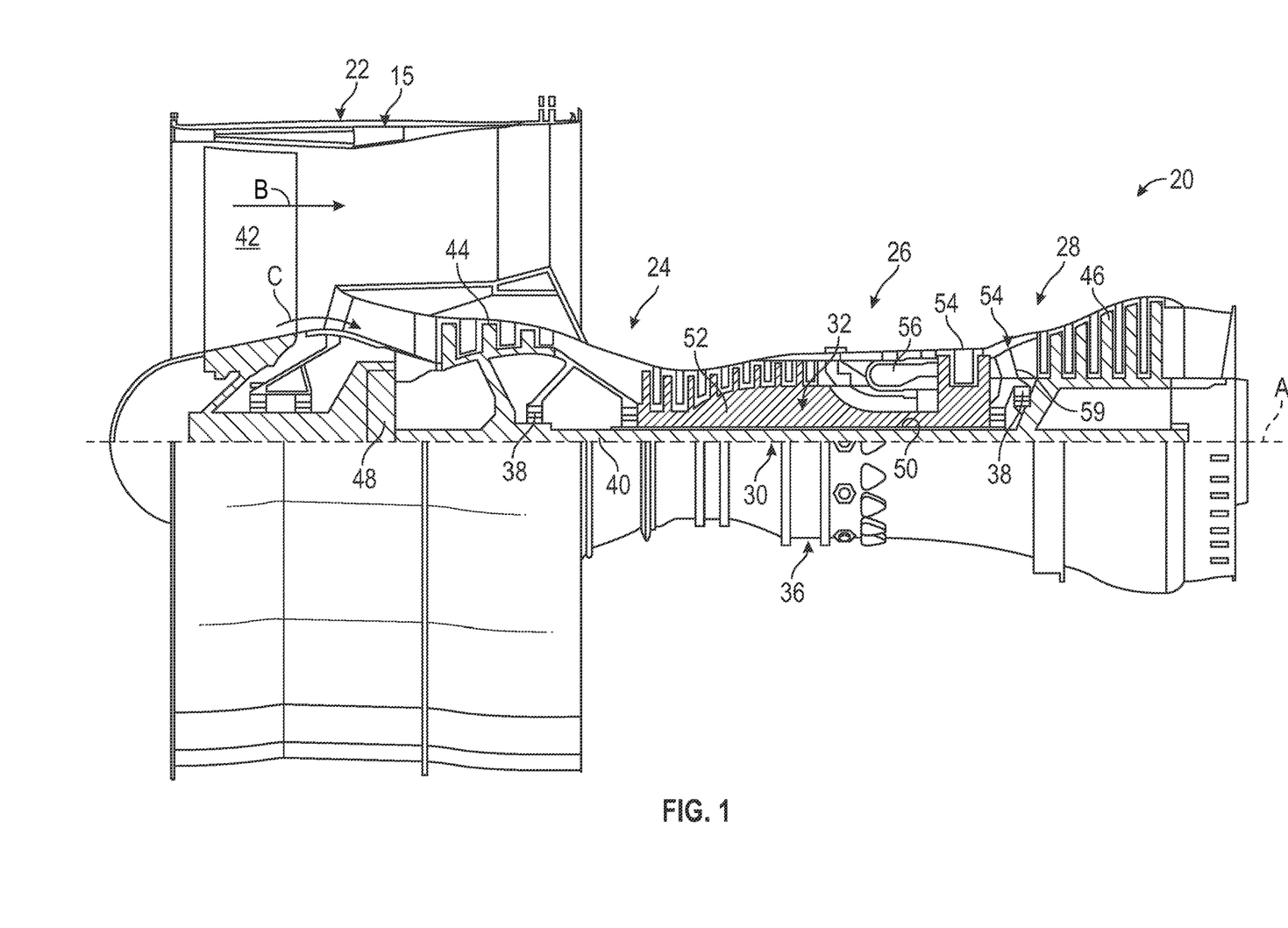
FIG. 1 depicts a gas turbine engine according to a non-limiting embodiment of the present disclosure.

With reference now to FIG. 1, a gas turbine engine 20 is schematically shown according to a non-limiting embodiment of the present disclosure. The gas turbine engine 20 disclosed herein is provided as one non-limiting example of an engine the sensor of the present disclosure may be used in. In other words, the sensor and method of operation using logic based on the sensor's output may be used in any suitable gas turbine engine and its use is not limited to the specific engine architectures illustrated in the attached FIGS. The gas turbine engine 20 illustrated in FIG. 1 may be referred to as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. It being understood that various embodiments of the present disclosure are applicable to engines that may or may not have the aforementioned geared architecture 48. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions and configurations of the fan section 22, compressor section 24, combustor section 26, turbine section 28, and fan drive gear system 48 may be varied. For example, gear system 48 may be located aft of combustor section 26 or even aft of turbine section 28 or removed entirely, and fan section 22 may have different configurations and/or may be positioned forward or aft of the location of gear system 48.

Figure 2:
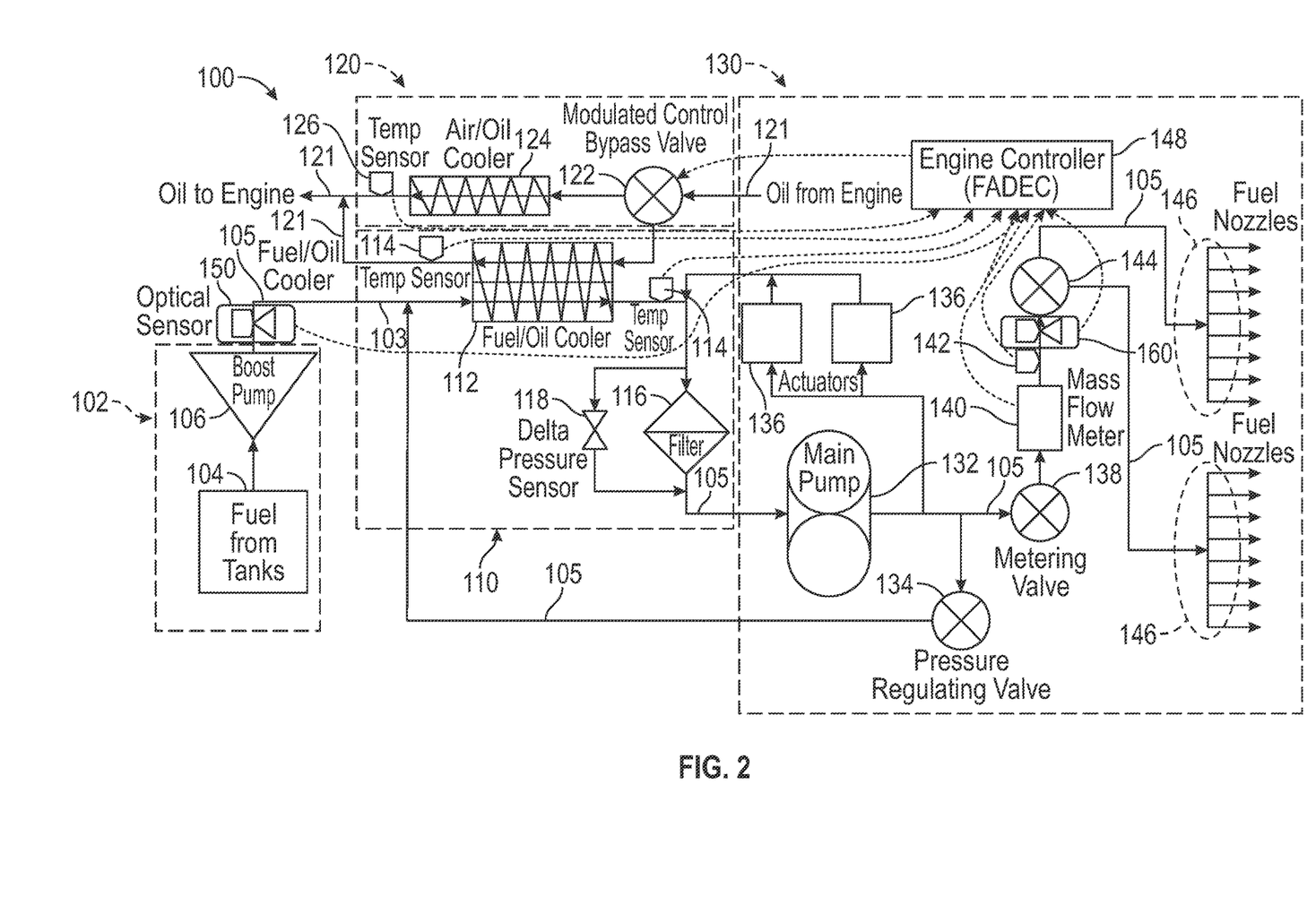
FIG. 2 is a schematic diagram illustrating gas engine turbine fuel system according to a non-limiting embodiment of the present disclosure.

With reference now to FIG. 2, a gas engine turbine fuel system 100 is illustrated according to a non-limiting embodiment of the present disclosure. The gas engine turbine fuel system 100 includes a fuel delivery sub-system 102, a fuel delivery conditioning system 110, an oil cooling subsystem 120, and engine control subsystem 130.

The fuel delivery sub-system 102 is configured to deliver fuel to the gas turbine fuel system 100. The fuel delivery sub-system 102 includes one or more fuel tanks 104 and a boost pump 106. The fuel tanks 104 provide an initial stage where low-pressure fuel is stored. The boost pump 106 operates to increase the pressure of fuel stored in the tanks 104 to a higher pressure suitable for operating a gas turbine engine (e.g., engine 20) before delivering the fuel to the fuel delivery conditioning system 110 via a fuel line 103.

The fuel delivery conditioning system 110 is in fluid communication with the fuel delivery sub-system 102 and operates to ensure the delivered fuel is at a target pressure, a target temperature, and a target cleanliness level for operating the gas turbine engine. The fuel delivery conditioning system 110 includes a fuel/oil cooler 112, a fuel temperature sensor 114, a fuel filter 116, and a delta pressure sensor 116. The fuel/oil cooler 112 includes a fuel flow path to pass fuel received from the 102 and an oil flow path to pass oil received from the 120. The fuel performs a heat exchanging process that transfers the temperature of heated oil output from the gas turbine engine to the cooler fuel that flows through the fuel/oil cooler 112. The fuel temperature sensor 114 is located downstream from the fuel/oil cooler 112 and monitors the fuel temperature to ensure it reaches the target fuel temperature. The fuel filter 116 filters the fuel to remove impurities before the fuel is injected into the gas turbine engine. The delta pressure sensor 118 is placed in fluid communication with the fuel flowing through the fuel filter 116 and measures the pressure difference across the fuel filter 116. The measured pressure difference can be used to diagnose the operation of the fuel filter 116 and alert of any potential clogs or maintenance while also ensuring the fuel pressure remains at a target pressure level.

The oil cooling subsystem 120 is in signal communication with the engine control subsystem 130 and circulates oil 121 through the gas turbine engine. The oil cooling subsystem 120 includes a modulated control bypass valve 122, an air/oil cooler 124, and an oil temperature sensor 126. The modulated control bypass valve 122 receives heated oil 121 from the gas turbine engine and is controlled by the engine control subsystem 130 (e.g., a controller 148) to adjust the flow of the oil 121 to either the air/oil cooler 124 or the fuel/oil cooler 112.

When the bypass valve 121 is adjusted into a first position, for example, the valve 121 delivers the heated oil 121 to the fuel/oil cooler 112 while bypassing the air/oil cooler 124. As a result, the heat from the oil 121 is transferred to the fuel 105 flowing through the fuel/oil cooler 112. When the bypass valve 121 is adjusted into a second position, however, the heated oil 121 is delivered to the air/oil cooler 124 while bypassing the fuel/oil cooler 112. As a result, cooling of the fuel 105 is reduced while the oil 121 continues to be cooled by air/oil cooler 124. In one or more non-limiting embodiments, the bypass valve 121 can be adjusted between the first and second positions into one or more intermediate positions to deliver more fuel to the fuel/oil cooler 112 than the air/oil cooler 124 and vice versa. Thus, the cooling of the oil 121 can still be achieved, while actively controlling the amount of heat transferred to the fuel 105 without overheating the fuel 105 so as to prevent the onset of fuel coking.

The oil temperature sensor 126 is in signal communication with the engine control subsystem 130 and outputs a temperature signal indicating the temperature of the oil 121 output from the air/oil cooler 124. When, for example, the temperature of the oil 121 is less than an oil temperature threshold, the engine control subsystem 130 adjusts the bypass valve 122 to the oil 121 to the air/oil cooler 124. When the oil temperature is greater than or equal to the oil temperature threshold, the controller adjusts the bypass valve 122 to establish a bypass oil path and delivers the heated oil to the fuel/oil cooler 112.

When the bypass valve is adjusted into the first position, the air/oil cooler 124 receives the oil 121 output from the engine. The air/oil cooler 124 operates by using ambient air, which is has a temperature that is less than the temperature of the oil 121 output from the engine, to absorb heat from the engine oil 121 as it passes through an oil path within the air/oil cooler 124. According to a non-limiting embodiment, the heat exchange process can be enhanced using forced air flow, either from the aircraft's motion or auxiliary fans (not shown), which further reduces the oil temperature before the oil 121 is recirculated back into the engine.

When the bypass valve 122 is adjusted into the second position, the heated oil is delivered to an oil path in the fuel/oil cooler 112, which is located on an opposite side of the fuel path. The design of the fuel/oil cooler 112 ensures that these two fluids flow in close proximity to each other, separated by the walls of the cooler's channels, yet without mixing. As the heated oil 121 flows through the oil path, the oil's temperature decreases as its heat is conducted through the channel walls and absorbed by the fuel 105. The heat exchange process provided by the fuel/oil cooler not only cools down the oil 121, making it suitable for recirculation back into the engine for continued lubrication and cooling, but also heats the fuel 105. In addition, heating the fuel 105 is desirable in order to reduce its viscosity, thus reducing the work required to pump the fuel 105 to the high pressures required by the gas turbine engine. Heating the fuel also enables better performance of the fueldraulic actuators, improves the atomization of the fuel 105 leading to lower amounts of soot and non-volatile particulate emissions, and enables the waste heat from the engine that is captured by the oil 121 to be used to improve engine cycle efficiency rather than dumping the heat into the air bypass stream.

The engine control subsystem 130 includes a fuel pump 132, a pressure regulating valve 134, one or more fuel-driven actuator 136, a metering valve 138, a mass flow meter 140, a temperature sensor 142, a fuel injection valve 144, one or more fuel injection nozzles 146, and a controller 148. The fuel pump 132 pressurizes the filtered fuel to target pressure necessary to combustion. According to a non-limiting embodiment, the controller 148 can actively control the fuel pump 132 based on changing operating conditions of the gas turbine engine so that the fuel pressure meets a target pressure level.

The fuel 105 output from the pump 132 can be utilized to operate one or more fuel-driven actuators 136 (also referred to as "fueldraulic" actuators 136). For example, the 105 provides the motive force for controlling engine bleeds, clearance control valves, and compressor vanes positions. According to a non-limiting embodiment, the position of the fuel-driven actuators 136 is directed by the logic from the engine controller 148, and are powered by the pressure and flow from the fuel.

The pressure regulating valve 134 can be utilized to tune the fuel pressure and ensure it meets the target pressure level. The pressure regulating valve 134 can be a passive regulating valve or can be actively controller (e.g., by the controller 148). Accordingly, the pressure regulating valve 134 is adjusted (e.g., the flow path) to increase or decrease the flow of fuel passed therethrough based on real-time pressure readings.

The metering valve 138 can be controlled by the controller 148 to adjust the amount of the fuel delivered to the fuel injection nozzles 144 based on fuel demand. The mass flow meter 140 is disposed downstream from the metering valve 138 and measures the actual amount of fuel delivered to the engine. According to a non-limiting embodiment, the mass flow meter 140 outputs a flow signal to the controller 148, which indicates a real-time measurement of the amount of fuel delivered to the gas turbine engine. In this manner, the controller 148 can determine a fuel demand, and adjust the metering valve 138 to control the amount of fuel to be delivered to the gas turbine engine.

The fuel temperature sensor 142 is disposed upstream from the fuel nozzles 146. According to a non-limiting embodiment, the fuel temperature 142 can be implemented as a thermocouple, for example, and outputs a temperature signal indicating a temperature of the fuel input to the fuel nozzles 146 (e.g., a nozzle fuel input temperature). Accordingly, the controller 148 receives the temperature signal and processes/decodes it to determine the fuel temperature before it is delivered into the fuel nozzles 146.

The fuel injection valve 144 and fuel injection nozzles 146 operate together to deliver the fuel 105 into the engine. According to a non-limiting embodiment, the fuel injection valve 144 can be adjusted by the controller 148 to vary the amount of fuel delivered to the fuel injection nozzles 146. The fuel injection nozzles 146 atomizes the fuel 105 and delivers fuel into the engine combustor (not shown). While the fuel flows through the fuel injection nozzles 146, the fuel temperature will increase due to the fuel nozzle being immersed in the hot gases from the compressor. It should be appreciated that the number of fuel nozzle groups and/or the number of fuel nozzles 146 in each group can be more or less than shown in FIG. 2 without departing from the scope of the invention.

With continued reference to FIG. 2, the gas engine turbine fuel system 100 further includes a first optical coking sensor 150 disposed upstream from the fuel fuel/oil cooler 112 and a second optical coking sensor 160 disposed downstream from the fuel/oil cooler 112. For example, the first optical coking sensor 150 is interposed between the fuel delivery subsystem 102 and the fuel delivery conditioning system 110 to determine a first thermal stress (e.g., a fuel darkening) of the fuel 105 output from the fuel tanks 104. The second optical coking sensor 160 is disposed upstream from the fuel sensors 146 to determine a second thermal stress (e.g., a fuel darkening) of the fuel 105 as it enters the fuel nozzles 146. In both instances, the thermal stress (e.g., a fuel darkening) of the fuel can be utilized to detect the onset of coking in the fuel 105.

Figure 3:
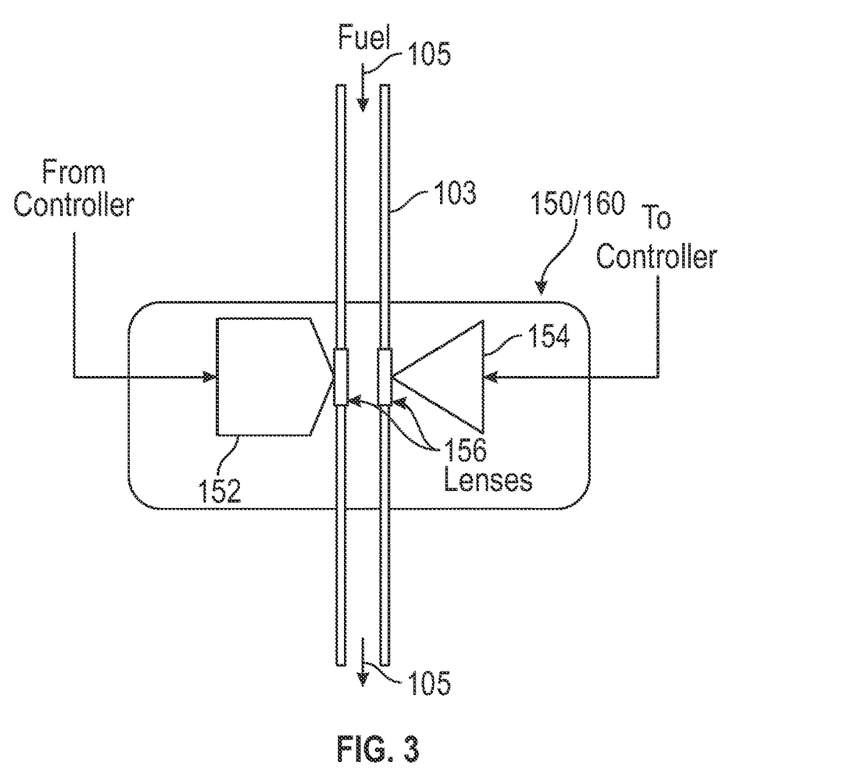
FIG. 3 depicts an optical coking sensor included in the gas engine turbine fuel system according to a non-limiting embodiment of the present disclosure.

The first optical coking sensor 150 and the second optical coking sensor 160 each have a light source and a light receiver/sensing element (see FIG. 3). The light source emits light that is directed toward the fuel 105 and is preferably in the UV range where the thermal stress of the fuel 105 is most easily detected. The light receiver measures the absorption of the light by the fuel 105, with a measurement cell permitting the passage of light through the fuel 105. According to a non-limiting embodiment, the first optical coking sensor 150 is disposed near the entrance of the fuel system (e.g., at the output of the fuel delivery subsystem 102) and the second optical coking sensor 160 is disposed at location downstream from where heat is placed in the fuel 105, e.g., downstream from a heat exchanger, but upstream from the fuel lines where the fuel 105 is manifolded to enter into the fuel nozzles 146.

The first optical coking 150 measures a baseline coloring/staining of the fuel 105 output from the fuel delivery subsystem 102 (e.g., from the fuel tanks 104), which will not have any thermal stress since at this stage it has not undergone thermal heating and cooling. When the engine is turned on, but before the engine heats up, the first and second optical coking sensors 150 would baseline against each other. As the engine begins to heat up, the second optical coking sensor 160 measures a degree of thermal stress (e.g., thermal coloring/staining) of the fuel 105 as it is heated. The thermal coloring/staining can be compared to the thermal coloring/staining of the incoming fuel measured by the first optical coking sensor 150. According to a non-limiting embodiment, the temperature sensor 142 can be disposed upstream from the fuel nozzles 146 or can be integrated in the second optical coking sensor 160 downstream sensor in order to limit the potential temperature rise to a target temperature range that preserves various engine component system components (e.g., seals, O-rings, valves, etc.) as well as to avoid potential cavitation of the fuel 105 in the fuel nozzles 146.

The controller 148 output signals that drive the first and second optical coking sensors 150 and 160 and receive signals from the first and second optical coking sensors to determine the thermal stress (e.g., fuel coloring/staining) of the fuel 105. Both thermal stress measurements can then be used by the controller 148 to determine the onset of coking in the fuel 105 and actively control the amount of heat added to the fuel 105. As discussed above, the fuel 105 output from the fuel delivery subsystem 102 will have a baseline coloring/staining (a light and transparent color) since it has not yet been conditioned and heated. However, the fuel 105 entering the fuel nozzles 146 will undergo conditioning and heating that applies a thermal stress on the fuel 105 and cause coloring/staining to change (e.g., become darker). Accordingly, the controller 148 can compare a first measurement provided by the first optical coking sensor 150 to a second measurement provided by the second optical coking sensor 160 to detect a change in the thermal stress (e.g., coloring/staining) of the fuel 105 indicating the onset of coking in the fuel 105.

When the change in thermal stress is detected, the controller 148 can then determine the temperature of the fuel 105 using the temperature measurement signal output from the temperature sensor 142. Accordingly, the controller 148 can set the temperature measured at the time the thermal stress is detected as the "coking temperature," i.e., the fuel temperature at which coking onset occurs in the fuel 105. The controller 148 can also determine voltage levels indicative of thermally stressed color/staining of the fuel 105 in which coking has occurred. This thermally stressed color/staining of the fuel 105 can be utilized as a threshold (e.g., a darkening threshold) indicating the fuel 105 has reached a temperature at which the onset of coking occurs. In this manner, the maximum amount of heat to be placed in the fuel 105 (e.g., via the fuel/oil cooler 112) can be determined in real-time by comparing the thermally stressed color/staining of the fuel 105 to the darkening threshold, thereby allowing the controller 148 to actively control the amount of heat transferred to the fuel and adjust the fuel temperature to prevent the occurrence of coking in the fuel 105 and the fuel nozzles 146.

In another non-limiting embodiment, the controller 148, for example, compares the coloring/staining determined using output voltage levels generated by the first optical coking sensor 150 (e.g., the baseline coloring/staining) to the thermally stressed coloring/staining determined using the output voltages generated by the second optical coking sensor 160 (e.g., indicative of thermal stress realized by the fuel 105 as it flows through the fuel system 100). When the thermally stressed coloring/staining diverges from the baseline coloring/staining and reaches or exceeds the coloring/staining corresponding to the coking temperature set point, the controller 148 actively adjusts the bypass valve 122 to reduce the amount of heated oil 121 delivered to the fuel/oil cooler 112, thereby reducing the heat added to the fuel 105 so as to reduce the fuel temperature. When the thermally stressed coloring/staining has not reached or exceeded the coloring/staining corresponding to the coking temperature set point, however, the controller 148 actively adjusts the bypass valve 122 to increase the amount of heated oil 121 delivered to the fuel/oil cooler 112, thereby increasing the heat added to fuel 105 so as to increase the fuel temperature. Accordingly, the controller 148 can actively prevent, or at least mitigate, coking of the fuel nozzles 146, while also maximizing the heat sink potential of the fuel 105 and the fuel burn benefit of heated fuel (e.g., 0.3% for 100 F° in temperature rise).

Figure 4:
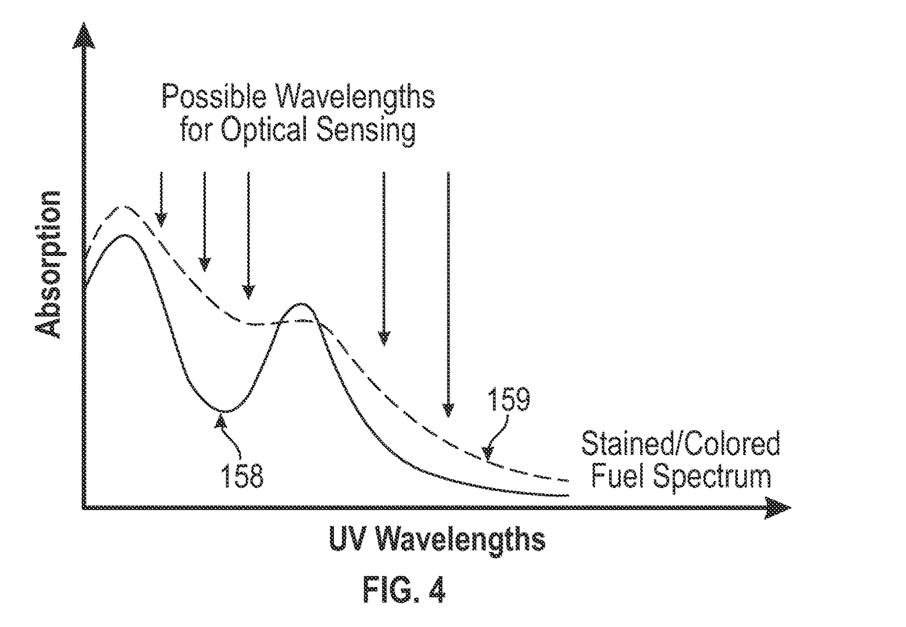
FIG. 4 is a graph depicting a variation of light absorption in fuel with respect to different ultraviolet (UV) wavelengths directed at the fuel.

Turning to FIG. 3, an optical coking sensor 150/160 representing the first optical sensor 150 or the second optical coking sensor 160 is illustrated according to a non-limiting embodiment of the present disclosure. The optical coking sensor 150/160 includes a light source 152 and a light sensing element 154. The light source 152 receives a power signal that drives the light source 152 to emit light toward the fuel 105. The light source 152 can be implemented as an ultraviolet (UV) light emitting diode (LED), which emits light in the UV wavelength range. As shown in FIG. 4, for example, different wavelengths of light may have different absorption levels based on the type of fuel 105 utilized in the fuel system 100. For example, light having a first wavelength 158 may be susceptible to absorption by a given fuel type, making it difficult for the light sensing element to detect a the light exiting the fuel 105. Therefore, light with a second wavelength 159 that is less susceptible to absorption can be selected to ensure a greater the light sensing element 154 can detect the light exiting the fuel 105. Accordingly, different light sources and/or wavelengths of light to be directed to the fuel can be selected based on the type of fuel in order to improve the sensitivity of the light detection provided by the light sensing element 154. In another non-limiting embodiment, the amount of light absorbed at the different wavelengths can be compared to each other, creating a map or "fingerprint" of the different absorptions, and how they change as the fuel is thermally stressed. Measuring a map or "fingerprint" in this fashion is advantageous to give more stable measurements as fluctuations may occur in system voltage or in the degradation of the sensor and optics.

Referring again to FIG. 3, the light sensing element 154 outputs a signal indicating a detection of light exiting the fuel 105. The light sensing element 154 can be implemented, for example, as a UV photodiode, a UV Phototransistor, a UV charge-coupled device (CCD), and a complementary metal-oxide-semiconductor (CMOS) sensor. In one or more non-limiting embodiments, the optical coking sensor 150/160 can include one or more lenses 156, which focuses the light from the light source toward the fuel 105 and/or focuses the light exiting the fuel 105 toward the light sensing element 154.

Light emitted from the light source 152 can be directed through the fuel 105, while the light sensing element 154 detects the light and outputs a signal corresponding to an amount of light detected at the various wavelengths. Accordingly to a non-limiting embodiment, the signal output by the light sensing element 154 has a voltage level corresponding to an amount of light detected by the light sensing element 154. As the coloring/staining of the fuel 105 changes (e.g., becomes darker to heating), the amount of light absorbed by the fuel 105 increases in certain spectral bands (e.g., a given spectral band range), thereby reducing the amount of light detected by the light sensing element in those spectral bands 154. Accordingly, the controller 148 can detect a reduction in the spectral bands of the detected light and determine thermal stress in the fuel 105 has occurred which is indicative of the onset of coking.

Figure 5:
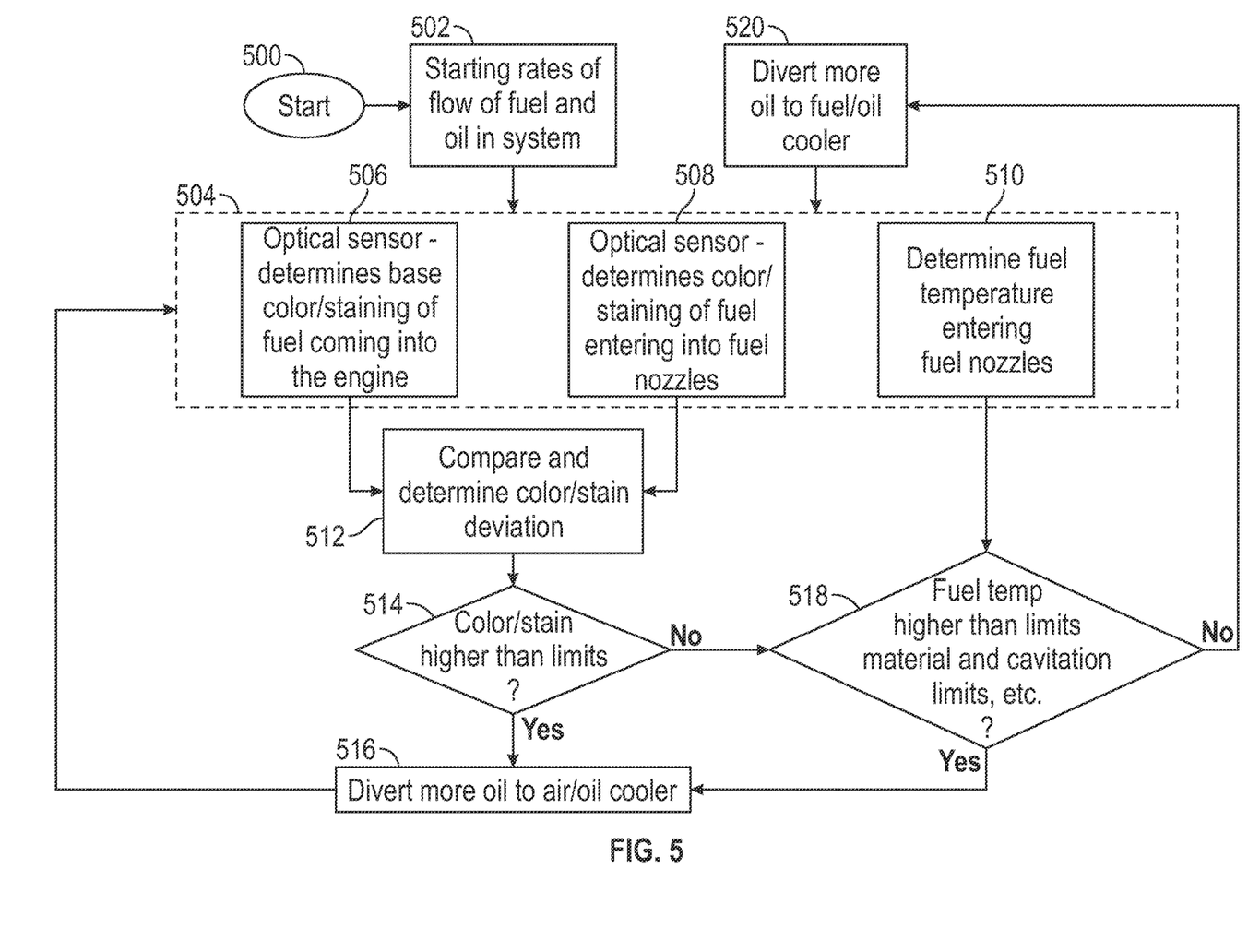
FIG. 5 is a flow diagram illustrating a method of controlling oil flow in a gas turbine engine fuel system based on a fuel coking temperature according to a non-limiting embodiment of the present disclosure.

Turning now to FIG. 5 a method of controlling oil flow in a gas turbine engine fuel system based on a fuel coking temperature is illustrated according to a non-limiting embodiment of the present disclosure. The method begins at operation 500, and initial amounts of fuel and oil are delivered to the fuel system according to a fuel flow rate and an oil flow rate 502. At operation 504, fuel temperature measurements are performed. The fuel temperature measurements include determining a base color/staining of fuel 105 driving the gas turbine engine e.g., the fuel delivered from the fuel delivery sub-system 102 using a first optical coking sensor 150 at operation 506, determining base color/staining of fuel 105 entering the fuel nozzles 146 using a second optical coking sensor 160 at operation 508, and determining a fuel temperature of the fuel entering the fuel nozzles 146 using a temperature sensor 142 at operation 510. At operation 512, the thermally stressed color/staining of the fuel 105 entering the fuel nozzles 146 (or a manifold of the gas turbine engine) determined by the second optical coking sensor 160 is compared to the baseline color/staining fuel determined by the first optical coking sensor 150 output from the fuel delivery subsystem 102 to determine color/staining deviation. When the deviation of the color/staining of the fuel 105 determined by the second optical coking sensor is greater than a darkening threshold (e.g., the color/staining of the fuel corresponding to the coking temperature set point) at operation 514, a greater amount of heated oil 121 is diverted to the air/oil cooler 124 compared to the fuel/oil cooler 112 at operation 516 to cool the fuel 105, and the fuel temperature measurements are continued at operation 504.

When, however, the deviation of the color/staining of the fuel 105 determined by the second optical coking sensor is less than or equal than a darkening threshold (e.g., the color/staining of the fuel corresponding to the coking temperature set point) at operation 514, the method proceeds to operation 518 to determine whether the fuel temperature of the fuel 105 entering the fuel nozzles 146 is greater than one or more fuel temperature thresholds (e.g., a material threshold, a cavitation threshold, etc.). When the fuel temperature is greater than one or more of the fuel temperature thresholds, a greater amount of heated oil 121 is delivered to the air/oil cooler 124 compared to the fuel/oil cooler 121 at operation 516, and the fuel temperature measurements are continued at operation 504. Otherwise, a greater amount of heated oil 121 is delivered to the fuel/oil cooler 112 compared to the air/oil cooler 124 at operation 520 to heat the fuel 105, and the fuel temperature measurements are continued at operation 504.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine fuel system comprising:
a fuel delivery subsystem to deliver fuel to a gas turbine engine;
an oil cooling subsystem configured to receive heated oil from the gas turbine engine;
a fuel delivery conditioning system including a fuel/oil cooler that is downstream of and in fluid communication with the fuel delivery subsystem to receive the fuel and is in fluid communication with the oil cooling subsystem to receive the heated oil, the fuel/oil cooler configured to transfer heat from the heated oil to the fuel to increase a temperature of the fuel;
a fuel manifold downstream of and fluidly connected to the fuel/oil cooler, the fuel manifold providing the fuel to fuel nozzles of the gas turbine engine;
a fuel temperature sensor downstream of the fuel/oil cooler;
a first optical coking sensor disposed upstream from the fuel/oil cooler and a second optical coking sensor disposed downstream from the fuel/oil cooler; wherein the first optical coking sensor outputs a first signal and the second optical coking sensor outputs a second signal;
wherein the first signal corresponds to a first measurement of a first amount of ultraviolet light detected at various wavelengths having passed through the fuel indicating a first thermal stress of the fuel delivered by the fuel delivery subsystem, and the second signal corresponds to a second measurement of a second amount of ultraviolet light detected at the various wavelengths having passed through the fuel indicating a second thermal stress of the fuel downstream of the fuel/oil cooler and delivered into the fuel manifold;
a controller in signal communication with the fuel temperature sensor, the first optical coking sensor and the second optical coking sensor, the controller configured to determine an onset of coking in the fuel, wherein the controller:
compares the first measurement indicating the first thermal stress of the fuel to the second measurement indicating the second thermal stress of the fuel;
determines a deviation of the second measurement compared to the first measurement in which the second amount detected is reduced compared to the first amount detected indicating a change in thermal stress of the fuel;
upon detection of the deviation, the controller utilizes the deviation as a threshold indicative of the onset of coking in the fuel and determines a fuel temperature using a temperature measurement signal output from the fuel temperature sensor and sets the fuel temperature as a coking temperature indicative of the onset of coking in the fuel at the threshold.

2. The gas turbine engine fuel system of claim 1, wherein the first optical coking sensor and the second optical coking sensor each comprise: a respective light source configured to deliver light toward the fuel; and a respective light sensing element configured to detect the light traveling through the fuel.

3. The gas turbine engine fuel system of claim 2, wherein the first signal indicates the first amount of ultraviolet light and the second signal indicates the second amount of ultraviolet light absorbed by the respective light sensing element in a given spectral band range.

4. The gas turbine engine fuel system of claim 3, wherein each respective light source includes a light emitting diode (LED).

5. The gas turbine engine fuel system of claim 4, wherein each respective light sensing element includes one or a combination of, a photodiode, a phototransistor, a charge-coupled device (CCD), and a complementary metal-oxide-semiconductor (CMOS) sensor.

6. The gas turbine engine fuel system of claim 5, wherein the LED is an ultraviolet (UV) LED configured to emit ultraviolet light.

7. A method of determining an onset of coking in fuel flowing through a gas turbine engine fuel system,
the gas turbine engine fuel system comprising:
a fuel delivery subsystem to deliver fuel to a gas turbine engine;
an oil cooling subsystem configured to receive heated oil from the gas turbine engine;
a fuel delivery conditioning system including a fuel/oil cooler that is downstream of and in fluid communication with the fuel delivery subsystem to receive the fuel and is in fluid communication with the oil cooling subsystem to receive the heated oil, the fuel/oil cooler configured to transfer heat from the heated oil to the fuel to increase a temperature of the fuel;
a fuel manifold downstream of and fluidly connected to the fuel/oil cooler, the fuel manifold providing the fuel to fuel nozzles of the gas turbine engine;
a fuel temperature sensor downstream of the fuel/oil cooler;
a first optical coking sensor disposed upstream from the fuel/oil cooler and a second optical coking sensor disposed downstream from the fuel/oil cooler; wherein the first optical coking sensor outputs a first signal and the second optical coking sensor outputs a second signal;

wherein the first signal corresponds to a first measurement of a first amount of ultraviolet light detected at various wavelengths having passed through the fuel indicating a first thermal stress of the fuel delivered by the fuel delivery subsystem, and the second signal corresponds to a second measurement of a second amount of ultraviolet light detected at the various wavelengths having passed through the fuel indicating a second thermal stress of the fuel downstream of the fuel/oil cooler and delivered into the fuel manifold;

a controller in signal communication with the fuel temperature sensor, the first optical coking sensor and the second optical coking sensor; the controller configured to determine an onset of coking in the fuel, wherein the controller:

compares the first measurement indicating the first thermal stress of the fuel to the second measurement indicating the second thermal stress of the fuel;

determines a deviation of the second measurement compared to the first measurement in which the second amount detected is reduced compared to the first amount detected indicating a change in thermal stress of the fuel;

upon detection of the deviation, the controller utilizes the deviation as a threshold indicative of the onset of coking in the fuel and determines a fuel temperature using a temperature measurement signal output from the fuel temperature sensor and sets the fuel temperature as a coking temperature indicative of the onset of coking in the fuel at the threshold;

the method comprising:

delivering the fuel from the fuel delivery subsystem to drive the gas turbine engine;

delivering the fuel to the fuel delivery conditioning system including the fuel/oil cooler;

selectively delivering the heated oil from the gas turbine engine to the oil cooling subsystem and to the fuel/oil cooler, the fuel/oil cooler configured to transfer heat from the heated oil to the fuel to increase the temperature of the fuel;

outputting, via the first at least one optical coking sensor and the second optical coking sensor, respectively, the first signal and the second signal indicating, respectively, the first thermal stress and the second thermal stress a thermal stress of the fuel that occurs with a changing temperature of the fuel; and determining, via the controller, the onset of coking in the fuel based on the deviation of the second measurement of the second signal compared to the first measurement of the first signal, utilizing the deviation as the threshold indicative of the onset of coking and setting the fuel temperature measured by the fuel temperature sensor as the coking temperature.

8. The method of claim 7, wherein outputting, via the first optical coking sensor and the second optical coking sensor, respectively, the first signal and the second signal each comprises:

delivering ultraviolet light from a respective light source toward the fuel; and detecting the respective amount of ultraviolet light traveling through the fuel using a respective light sensing element; and outputting the respective signal based on the respective amount of ultraviolet light detected by the respective light sensing element.

9. The method of claim 8, wherein the first signal and the second signal, respectively, indicate the first amount of ultraviolet light and the second amount of ultraviolet light absorbed by the respective light sensing element in a given spectral band range.

* * * * *